(12) United States Patent
Fain et al.

(10) Patent No.: US 10,345,176 B2
(45) Date of Patent: Jul. 9, 2019

(54) DYNAMIC PRESSURE SENSOR WITH IMPROVED OPERATION

(71) Applicant: COMMISSARIAT A L'ENERGIE ATOMIQUE ET AUX ENERGIES ALTERNATIVES, Paris (FR)

(72) Inventors: Bruno Fain, Grenoble (FR); Philippe Robert, Grenoble (FR); Thierry Verdot, Saint Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 107 days.

(21) Appl. No.: 15/536,779

(22) PCT Filed: Dec. 18, 2015

(86) PCT No.: PCT/EP2015/080511
§ 371 (c)(1),
(2) Date: Jun. 16, 2017

(87) PCT Pub. No.: WO2016/097302
PCT Pub. Date: Jun. 23, 2016

(65) Prior Publication Data
US 2017/0363493 A1  Dec. 21, 2017

(30) Foreign Application Priority Data
Dec. 18, 2014 (FR) ...................................... 14 62718

(51) Int. Cl.
*G01L 9/00* (2006.01)
*G01L 23/08* (2006.01)
(Continued)

(52) U.S. Cl.
CPC .............. *G01L 9/0072* (2013.01); *G01L 9/12* (2013.01); *G01L 23/08* (2013.01); *H04R 1/38* (2013.01);
(Continued)

(58) Field of Classification Search
CPC . G01L 9/00; G01L 9/0072; G01L 9/08; G01L 9/12; G01L 23/08; H04R 1/38;
(Continued)

(56) References Cited

U.S. PATENT DOCUMENTS 6,170,332 B1  1/2001  MacDonald et al.
6,199,874 B1  3/2001  Galvin et al.
(Continued)

FOREIGN PATENT DOCUMENTS

CN  101014845 A  8/2007
CN  101587001 A  11/2009
(Continued)

OTHER PUBLICATIONS

U.S. Appl. No. 14/134,356, filed Dec. 19, 2013, US 2014/0177881 A1, Stephane Fanget et al.
(Continued)

*Primary Examiner* — Nguyen Q. Ha
(74) *Attorney, Agent, or Firm* — Oblon, McClelland, Maier & Neustadt, L.L.P.

(57) ABSTRACT

A MEMS and/or NEMS pressure sensor including, in a substrate: a stationary portion and a portion movable relative to the stationary portion, the movable portion including a sensitive element configured to move in the plane of the sensor under effect of a pressure variation; a stress gauge detecting movement of the sensitive element in the plane of the sensor due to the pressure variation; electrodes actuating the sensitive element, the actuating electrodes being borne partially by the stationary portion and partially by the
(Continued)

movable portion, the actuating electrodes being commanded to automatically control positionwise the movement of the sensitive element; a mechanism commanding the actuating electrodes, which is configured, on the basis of signals emitted by the gauge, to bias the actuating electrodes to automatically control positionwise the movement of the sensitive element.

25 Claims, 15 Drawing Sheets

(51) Int. Cl.

| | | |
|---|---|---|
| *H04R 17/02* | (2006.01) | |
| *H04R 19/00* | (2006.01) | |
| *H04R 19/04* | (2006.01) | |
| *H04R 1/38* | (2006.01) | |
| *G01L 9/12* | (2006.01) | |

(52) U.S. Cl.
CPC ........... *H04R 17/02* (2013.01); *H04R 19/005* (2013.01); *H04R 19/04* (2013.01); *H04R 2201/003* (2013.01)

(58) Field of Classification Search
CPC ...... H04R 17/02; H04R 19/00; H04R 19/005; H04R 19/04; H04R 2201/003
See application file for complete search history.

(56) References Cited

U.S. PATENT DOCUMENTS

| | | | |
|---|---|---|---|
| 6,497,149 | B1 | 12/2002 | Moreau et al. |
| 9,402,137 | B2* | 7/2016 | Hsu ...................... H04R 19/005 |
| 9,631,952 | B2 | 4/2017 | Robert et al. |
| 2009/0140443 | A1 | 6/2009 | Hohlfeld et al. |
| 2010/0277229 | A1 | 11/2010 | Lee et al. |
| 2012/0017693 | A1 | 1/2012 | Robert et al. |
| 2013/0000411 | A1 | 1/2013 | Robert et al. |
| 2017/0325025 | A1* | 11/2017 | Dorfmeister ............. H04R 3/06 |

FOREIGN PATENT DOCUMENTS

| | | |
|---|---|---|
| CN | 103234669 A | 8/2013 |
| EP | 2 021 739 | 2/2009 |
| EP | 2 066 015 A2 | 6/2009 |
| EP | 2 410 767 A1 | 1/2012 |
| EP | 2 541 222 A1 | 1/2013 |

OTHER PUBLICATIONS

U.S. Appl. No. 14/831,528, filed Aug. 20, 2015, US 2015/0355221 A1, Philippe Robert et al.
U.S. Appl. No. 14/885,433, filed Oct. 16, 2015, US 2016/0109348 A1, Philippe Robert et al.
U.S. Appl. No. 14/785,037, filed Apr. 16, 2014, US 2016/0080706 A1, Carlo Kaiser et al.
U.S. App. No. 15/248,756, filed Aug. 26, 2016, US 2017/0059420 A1, Patrice Rey et al.
International Search Report dated Jun. 23, 2016 in PCT/EP2015/080511 filed Dec. 18, 2015.
French Search Report dated Nov. 10, 2015 in FR1462718 filed Dec. 18, 2014.
Scheibner, Dirk et al., "A Frequency Selective Silicon Vibration Sensor with Direct Electrostatic Stiffness Modulation," Proceedings of Spie, vol. 4755, Apr. 2002, XP055225467, pp. 35-43.
Boser, Bernhard E., "Surface Micromachined Accelerometers," IEEE Journal of Solid-State Circuits, IEEE Service Center, vol. 31, No. 3, Mar. 1996, XP011060223, p. 366-375.
Steinmann, Andrew et al., "Sigma-Delta Control of a Biased and Initially-Displaced MEMS Microphone," Preprints of the 18$^{th}$ IFAC World Congress, 2011, pp. 3545-3550.
Van Der Donk, A.G.H. et al., "Preliminary Results of a Silicon Condenser Microphone with Internal Feedback," IEEE, 1991, pp. 262-265.
Helisto, P. et al., "Noise suppression of MEMS readout near pull-in," Sensor and Actuators A: Physical, vol. 183, 2012, pp. 101-104.
Office Action issued in corresponding Chinese Application No. 201580073662.4 dated Feb. 11, 2019, 18 pages (with English translation).

* cited by examiner

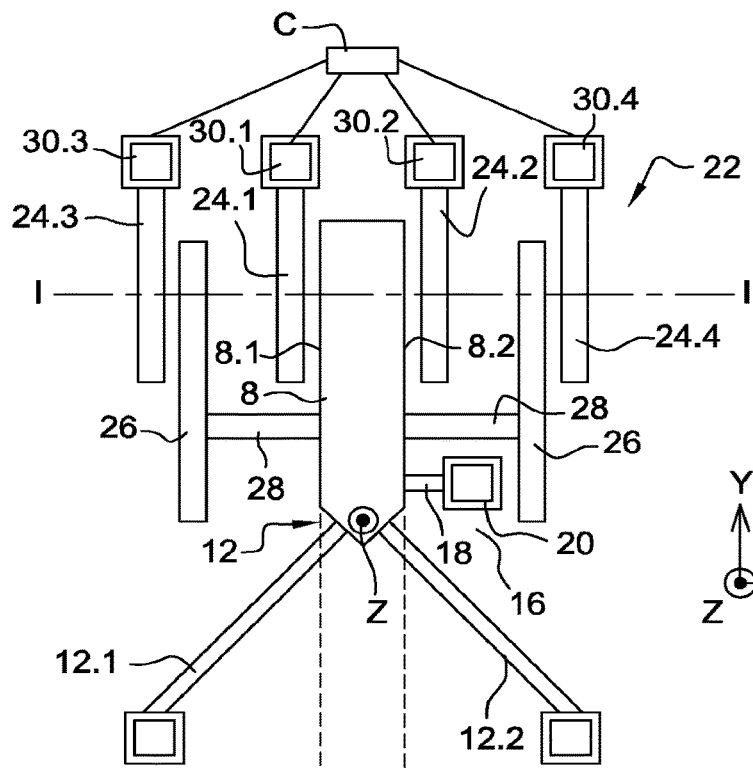
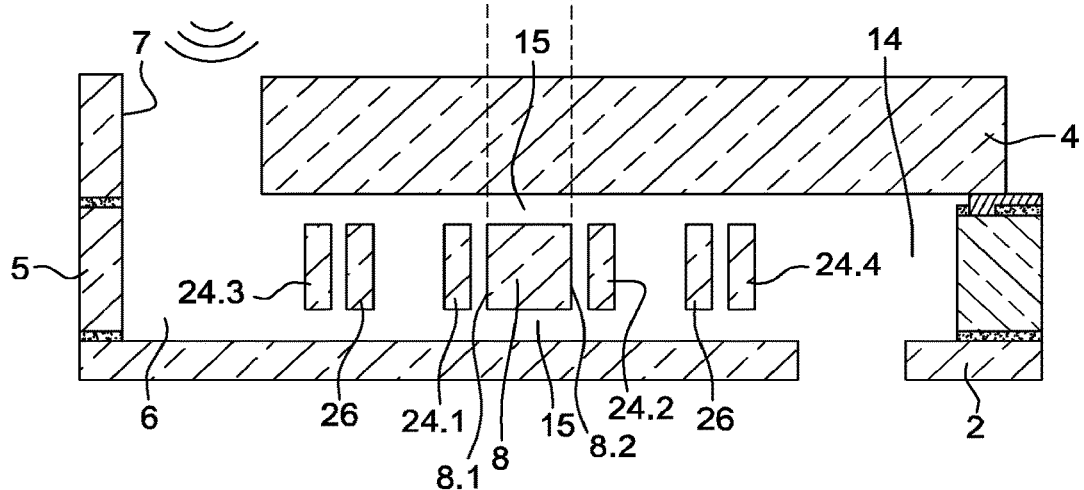

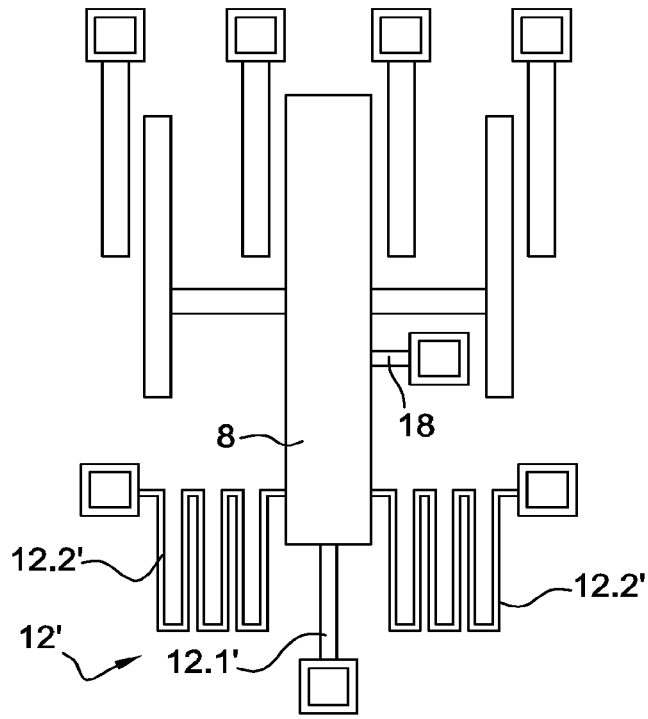
Fig. 2A'
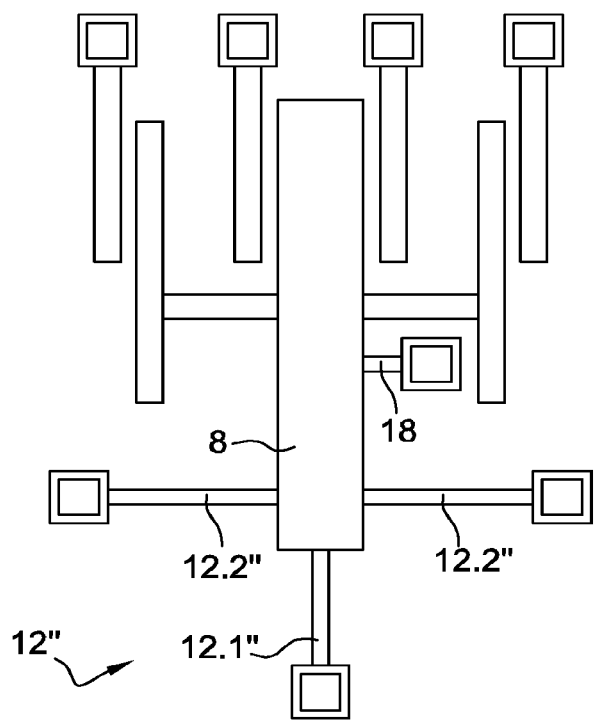
Fig. 2A"

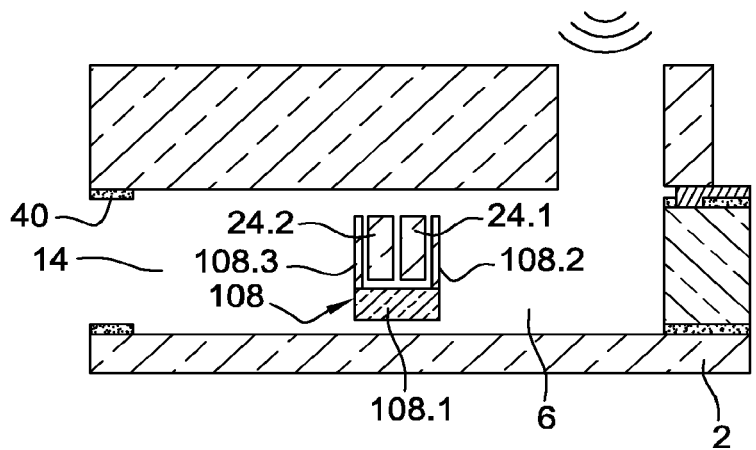
Fig. 9
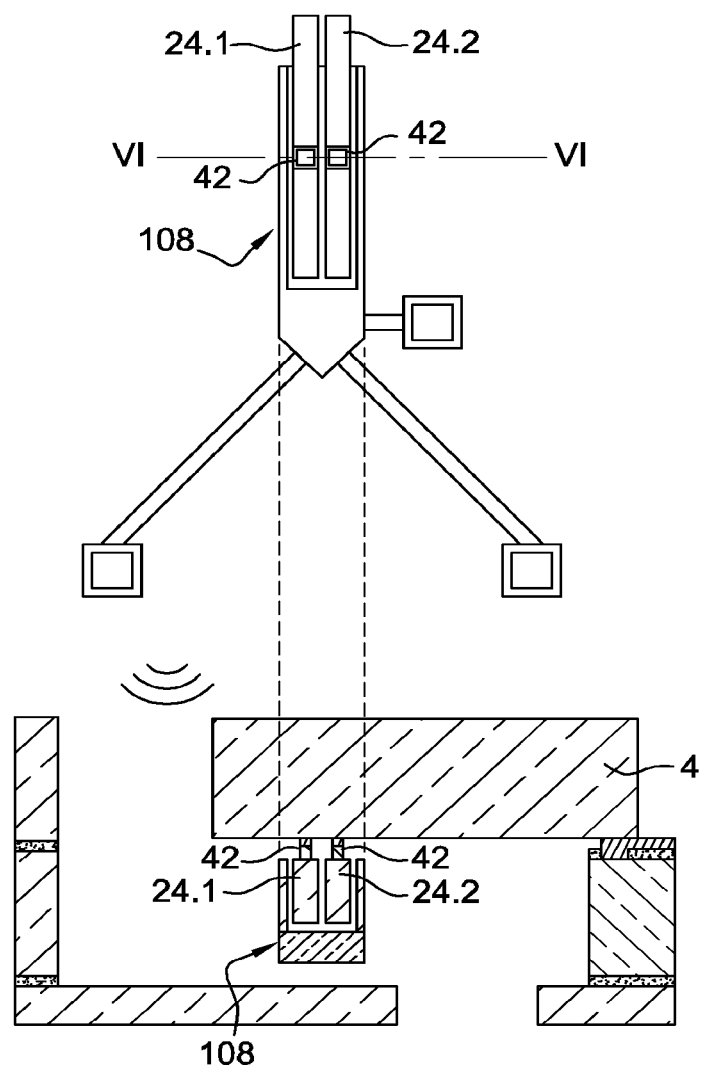
Fig. 10A
Fig. 10B

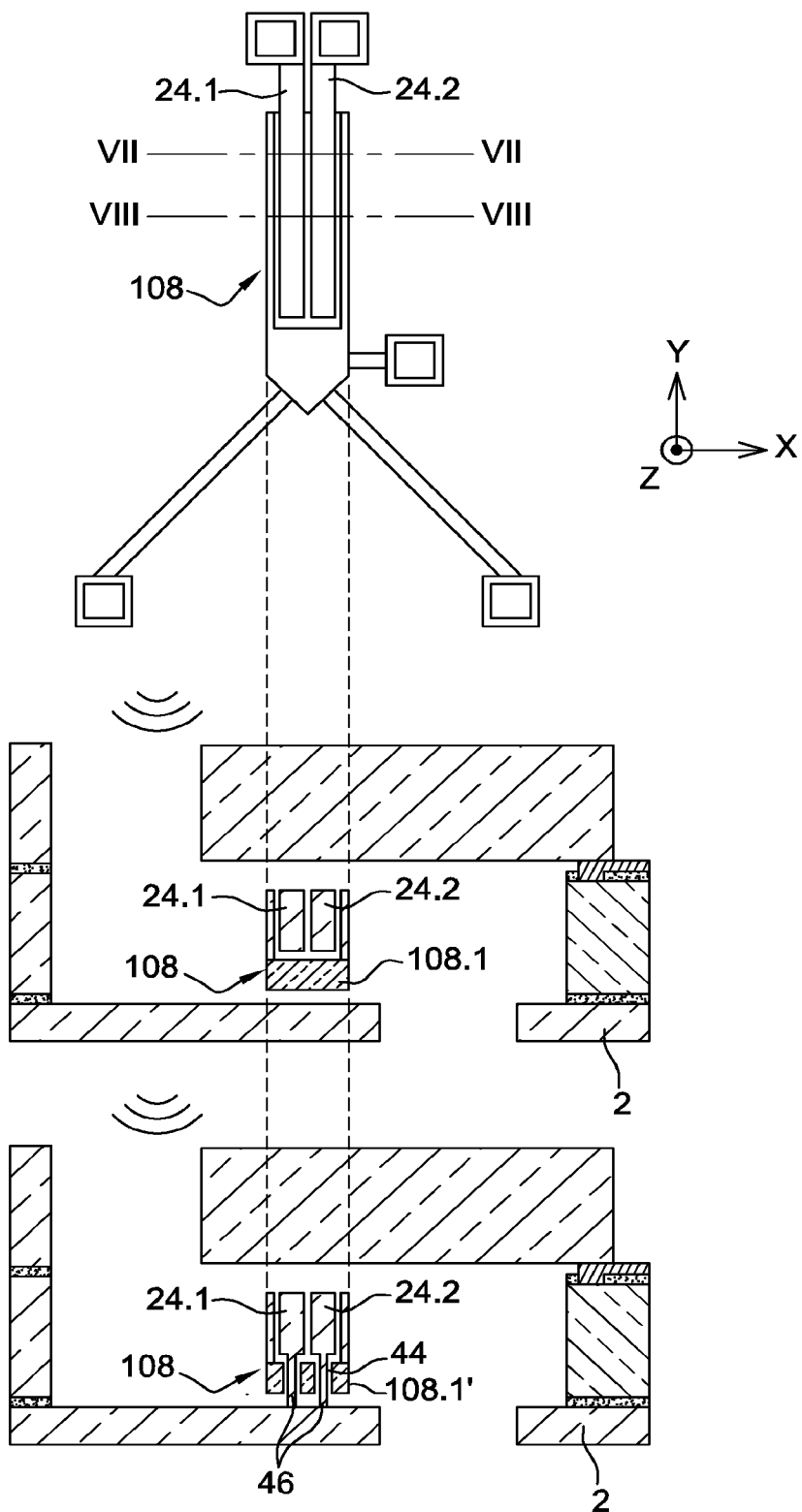

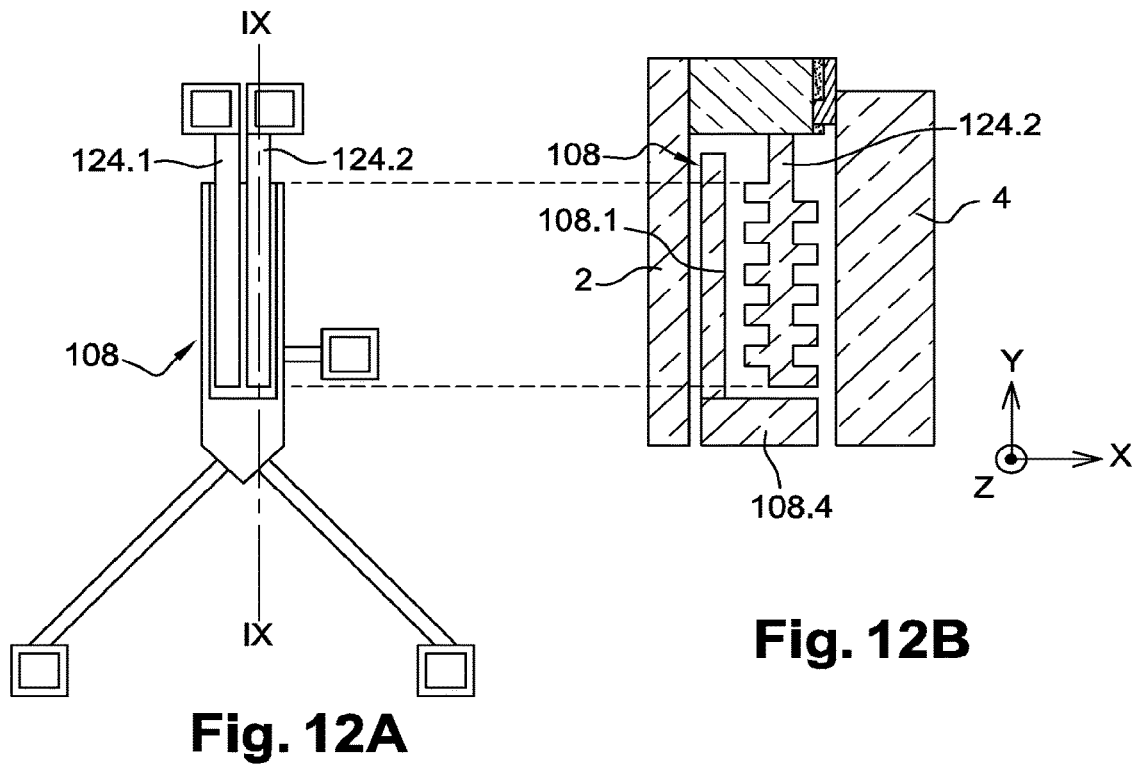
Fig. 12A
Fig. 12B
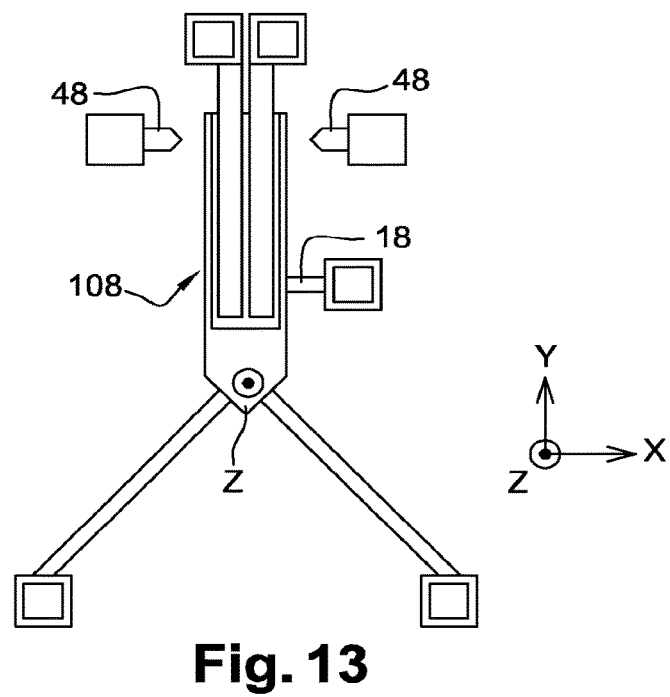
Fig. 13

DYNAMIC PRESSURE SENSOR WITH IMPROVED OPERATION

TECHNICAL FIELD AND STATE OF PRIOR ART

The present invention relates to a pressure sensor with improved operation, in particular a MEMS and/or NEMS pressure sensor, for example for applications in making microphones.

Document EP 2 410 767 describes a MEMS dynamic pressure sensor for example for making a microphone. This pressure sensor comprises a deformable cavity to receive pressure variations from the environment, the cavity being made in a substrate and one of its walls is movable in a direction parallel to the plane of the substrate. It also comprises means for detecting the movement of the wall, for example of the piezoresistive or capacitive type. This pressure sensor with in-plane movement has the advantage of separating the detecting part from the detecting wall which is sensitive to the acoustic pressure. Therefore, it is possible to optimize one and the other, thus, the sensor has an improved performance.

This pressure sensor however imposes to find a compromise between pass band and resolution; furthermore, the operating range is restrained by the configuration of the mechanical part of the detecting means, which limits possibilities for improving resolution and increasing full scale, in an application to a microphone, this is the difference between the maximum acoustic pressure that can be measured, i.e. the sound level the microphone is capable of recording without saturating, and the minimum acoustic pressure likely to be measured

DISCLOSURE OF THE INVENTION

Consequently, one purpose of the present invention is to offer a pressure sensor with an in-plane movement or deformation having an improved operation.

The purpose of the present invention is achieved by a pressure sensor with an in-plane movement or deformation comprising a part being movable or deformable along a direction parallel to the sensor plane under the effect of the pressure variation, detecting means for detecting the movement or deformation of the movable part and means for slaving in movement or deformation the sensitive element from the measurements of the detecting means.

By implementing such a slaving, the manufacture of the sensor and its operation are no longer limited by the gain/pass band and mechanical gain/dynamic range compromises of in-plane detecting sensors of the state of the art.

Preferably, the slaving means are distinct from the detecting means.

Preferably, the slaving means are of the capacitive type, but alternatively the slaving means can be of the piezoelectric type.

Advantageously, means for decreasing the mechanical stiffness of the sensitive element are implemented by electrostatic means, also designated by "means for applying trimming to the sensitive element", this trimming enabling the sensor performance to be substantially improved.

Preferably, in the case where in addition to the slaving means, trimming means are implemented, electrodes are dedicated to slaving and electrodes are dedicated to trimming.

In one particularly advantageous mode, the sensitive element comprises a housing receiving at least part of the slaving electrodes, thus they apply the electrostatic pressure on faces of the sensitive element which are different from those which are subject to the pressure variation to be measured. The actuating electrodes thus do not induce a head loss upstream and downstream of the movable structure, upstream being the side where the acoustic pressure to be measured is applied, for example the atmosphere. The sensitivity of the sensor is thereby not reduced.

Very advantageously, at least one of the actuating electrodes is structured to reduce viscous damping.

The sensor enables pressure variations, for example acoustic pressure variations to be measured, to make a microphone.

Therefore, one subject-matter of the present invention is a MEMS and/or NEMS type pressure sensor comprising in a substrate extending in a plane, called the sensor plane:
  a fixed part and a movable part being movable with respect to the fixed part, the movable part comprising at least one sensitive element able to be moved or deformed in the sensor plane under the effect of a pressure variation,
  detecting means for detecting the movement or deformation of the sensitive element in the sensor plane due to the pressure variation,
  first actuating means for actuating the movable part, said first actuating means being controlled so as to slave in position the movement or the deformation of the sensitive element,
  first controlling means for controlling the first actuating means which are configured, from signals emitted by the detecting means, to polarize the first actuating means so as to slave in position the movement or the deformation of the sensitive element.

For example, the first actuating means are of the capacitive type, said actuating means being carried partly by the fixed part and partly by the movable part.

Advantageously, the pressure sensor comprises second capacitive type actuating means for actuating the movable part, said actuating means being carried partly by the fixed part and partly by the movable part, and second controlling means for controlling the second actuating means to perform trimming of the element.

In the exemplary embodiment, the first actuating means and second actuating means are distinct.

In another exemplary embodiment, the first and second actuating means coincide, a polarization signal comprising an AC component from the first controlling means and a DC component from the second controlling means is then applied thereto.

The movable part can be rotatably hinged relative to the fixed part about an axis perpendicular to the sensor plane.

According to an additional characteristic, the detecting means are chosen from piezoresistive type or capacitive type means. When the detecting means are of the capacitive type, they can be distinct from the first and/or second actuating means.

The first and/or second actuating means can comprise at least two pairs of electrodes, each pair comprising a fixed electrode carried by the fixed part and a movable electrode facing it, carried by the movable part.

In one embodiment, the sensitive element comprises a face subject to said pressure variations, called the sensitive face, and comprises at least one housing delimited between two parallel walls of the sensitive element a wall of which carries the sensitive face, all or part of the fixed electrodes being disposed in said housing and all or part of the movable electrodes being located on the inner faces of the walls of the housing.

In one advantageous example, the sensitive element comprises a bottom connecting both parallel walls, said bottom comprising at least one through passage. Advantageously, the pressure sensor can then comprise at least one pillar for mechanically connecting at least one of the fixed electrodes to the fixed part through the through passage.

Preferably, at least one of the actuating electrodes is structured so as to facilitate exhaust of ambient medium from the space delimited between a fixed electrode and a movable electrode.

According to an additional characteristic, each fixed electrode can be connected to an electrical connection pad at a longitudinal end thereof or to an electrical connection pad in an intermediate part between both longitudinal ends thereof.

In one exemplary embodiment, the sensitive element is hinged at at least one longitudinal end.

The sensitive element can be disposed between at least one first cavity connected to the environment the pressure variations of which are desired to be measured and at least one second buffer cavity which communicates with the first cavity.

The pressure sensor can comprise two first distinct cavities connected to the environment the pressure variation of which is desired to be measured, and two second buffer cavities, the sensitive element being subject to pressure variations of both cavities.

The axis of rotation of the rotatable hinge can be located between both longitudinal ends of the sensitive element, preferably at an equal distance from both ends.

The detecting means are advantageously such that they allow a differential measurement.

In another embodiment, all or part of the fixed actuating electrodes are disposed on either side of the sensitive element.

The sensitive element can comprise a face subject to the pressure variations desired to be measured, called the sensitive face, one of the fixed actuating electrodes facing the sensitive face.

The movable part comprises for example at least two beams parallel to the sensitive element and disposed remote from the same, faces of said parallel beams facing the sensitive face forming all or part of the movable electrodes.

For example, the substrate comprises a support substrate and a cap substrate, the first cavity being connected to the environment the pressure variations of which are desired to be measured through an aperture of the cap substrate, the second cavity comprising an aperture in the support substrate opposite the aperture of the first cavity or a side aperture or the second cavity having a sufficient volume not to damp the movement of the movable part.

Another subject-matter of the present invention is a pressure sensor according to the present invention forming a dynamic pressure sensor.

Another subject-matter of the present invention is a microphone comprising at least one pressure sensor according to the present invention.

BRIEF DESCRIPTION OF THE DRAWINGS

The present invention will be better understood based on the description that follows and the appended drawings in which:

FIGS. 1A and 1B are top and cross-section views along plane I-I respectively of an exemplary embodiment of a first embodiment of a pressure sensor, FIG. 9 is a transverse cross-section view of an alternative embodiment of the second embodiment having a side aperture, FIGS. 10A and 10B are top and cross-section views along plane VI-VI respectively of another exemplary embodiment of the second embodiment wherein the electrical contacts of the actuating electrodes are located at a median part of the electrodes, FIGS. 11A, 11B, and 11C are top and cross-section views along plane VII-VII and VIII-VIII respectively of another exemplary embodiment of the second embodiment wherein the actuating electrodes are integral with the support substrate, FIGS. 12A and 12B are top and cross-section views along plane IX-IX respectively of another exemplary embodiment of the second embodiment wherein the sensitive element is structured, FIG. 13 is a top view of another exemplary embodiment of the second embodiment comprising stops.

DETAILED DISCLOSURE OF PARTICULAR EMBODIMENTS

Figure 2A:
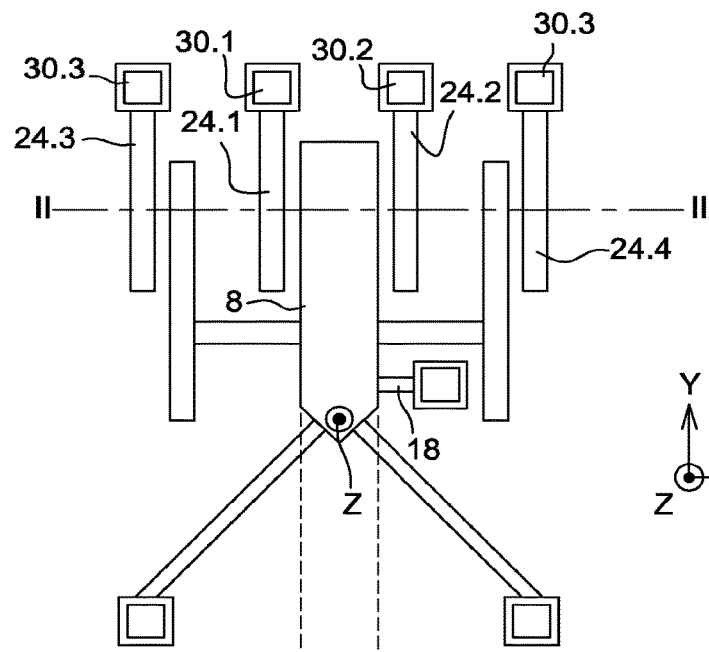
FIGS. 2A and 2B are top and cross-section views along plane II-II respectively of another exemplary embodiment of the first embodiment of a pressure sensor, FIGS. 2A' and 2A" are schematically represented top views of alternative embodiments of the sensor of FIG. 2A, FIGS. 3A and 3B are top and cross-section views along plane III-III respectively of another exemplary embodiment of the first embodiment of a pressure sensor.

In the description that follows, the same references will be used to designate elements having substantially the same shape and the same function.

In FIGS. 1A and 1B, an example of a first embodiment of a pressure sensor can be seen in a top and a cross-section view.

The sensor comprises a support substrate 2, designated in the following by support and a cap forming substrate 4 and designated by cap in the following.

The support 2 and the cap 4 are substantially planar and extend in a plane XY which will be designated by sensor plane in the following and which extends horizontally in the representation of FIG. 1B.

The sensor comprises a first deformable cavity 6 which is deformable in a direction contained in a plane XY.

The first cavity 6 is delimited between the support 2, the cap 4, a fixed sidewall 5 and a movable or deformable wall 8 in a direction contained in a plane XY. The first sensitive cavity 6 has an aperture 7 connecting the inside of the cavity 6 to the atmosphere the pressure variation, for example the acoustic pressure variation, of which is desired to be detected.

The sensor comprises a fixed part comprising the substrates and a movable part or movable structure partly formed by the movable wall or the sensitive element.

In the example represented, the movable wall 8 is formed by a rotatably movable beam about an axis Z perpendicular to the plane XY. The movable beam will be designated by "sensitive element" in the following.

A rotatable hinge 12 about the axis Z is located at a longitudinal end of the beam.

The rotatable hinge 12 with the axis Z is made in the example represented by two beams 12.1, 12.2 having intersecting axes, each integral by a longitudinal end with the sensitive beam 8 and anchored to the support 2 and/or the cap 4 by their other longitudinal end. The intersection of the axes of the beams is the intersection of the axis of rotation Z with the plane XY. The beams are for example anchored to the support by connection pads enabling the sensitive element to be polarized.

Preferably, the hinge 12 has a low stiffness in the plane and a strong stiffness out of the plane to avoid to touch the substrate or the cap. In FIG. 2A', an alternative embodiment of the sensor of FIG. 2A can be seen wherein the hinge 12' is formed by a beam 12.1' anchored to the substrate and substantially aligned with the sensitive element. The beam 12.1' is able to be flexurally deformed and two elastic elements 12.2' extending in the plane on either side of the movable wall and anchored to contacts for anchoring to the support 2 and/or the cap 4.

In FIG. 2A", another alternative can be seen wherein the hinge 12" is formed by a beam 12.1" substantially aligned with the sensitive element and able to be flexurally deformed and two beams 12.2" extending on either side of the sensitive element and anchored to the substrate and able to be compressionally/tensionally deformed.

The sensor also comprises a second cavity 14 disposed with respect to the first cavity on the other side of the sensitive element 8, the sensitive element comprises a face 8.1 on the side of the first cavity 6 and a face 8.2 on the other side of the second cavity 14. There is no pneumatic short-circuit between the first and the second cavity.

The second cavity 14 opens into the back face of the support substrate such that the pressure variation prevailing in the second cavity is not the one desired to be measured. As a variant, the second cavity 14 can have a sufficient volume to enable the sensitive element to be displaced under the effect of a pressure variation without excess damping; this volume is generally designated by "back volume". The volume of the second closed cavity could be for example at least 5 times the volume of the first cavity 6, for example 10 times the volume of the first cavity 6.

It will be noted that the sensitive element does not sealingly close the communication between the first cavity 6 and the second cavity 14. Clearances 15 are provided between the sensitive element and the support and between the sensitive element and the cap. The dimension of these clearances 15 in the direction Z is chosen to enable pressures to be balanced between the first and second cavity when the pressure variation has a low frequency and to make the sensitive element sensitive to pressure variations having a frequency higher than a given frequency, by virtue of viscous effects between the fluid, sensitive element and substrates.

The sensor also comprises detecting means 16 for detecting the movement or deformation of the sensitive element.

In the example represented, the detecting means are with a strain gauge and are formed by a gauge 18 of piezoresistive material suspended between the sensitive element 8 and a contact pad 20 anchored to the support. Preferably, the axis of the gauge 18 is perpendicular to the axis of the sensitive element. If the gauge is located downstream of the sensitive element, the gauge is compressed when the sensitive element is moved in the clockwise direction and stretched when the sensitive element is moved in the anti-clockwise direction. The detecting means could alternatively be of the capacitive type, such means will be described more in detail in the second embodiment.

The pressure sensor also comprises means for slaving in position or deformation the sensitive element. The slaving means comprises actuating means which are advantageously of the capacitive type 22 enabling an electrostatic feedback force to be applied to the sensitive element and electronic controlling means so as to apply the electrostatic feedback force by the capacitive actuating means, this feedback force being determined as a function of the signal from the detecting means.

The actuating means comprise at least two pairs of electrodes. In the example represented, a first pair comprises an electrode 24.1 secured to the fixed part and a movable electrode belonging to the movable structure and formed on at least one part of the face 8.1 of the sensitive element, and a second pair comprises an electrode 24.2 secured to the fixed part and a movable electrode belonging to the movable structure and formed by an opposite face on at least one part of the face 8.2 of the sensitive element.

When the material of the sensitive element is electrically conductive, for example of doped silicon, the movable electrodes can be directly formed by the side faces of the sensitive element. In the opposite case, the movable electrodes are formed by a conductive deposit on the side faces of the sensitive element.

In the example represented, the actuating means comprise two pairs of electrodes in addition, thus four pairs of actuating electrodes in total. The movable structure comprises additional beams 26 disposed in parallel to and remote from the sensitive element 8 and secured to the sensitive element by arms 28. These additional beams have faces parallel to the sensitive face of the beam. The additional beams are mechanically integral with the movable beam 8 so as to form a rigid assembly with the sensitive element 8 and are electrically connected to the movable beam. The actuating means then comprise electrodes 24.3, 24.4 integral with the support opposite to the faces of the additional beams. Preferably, the electrodes are symmetrically disposed with respect to the sensitive element 8 to exert electrostatic forces with opposite directions.

Alternatively, the actuating means could only comprise the electrodes 24.1 and 24.2 or the electrodes 24.3 and 24.4.

In order to limit inertia of the sensitive element, it is preferable to reduce the number of beams carrying the slaving/actuating electrodes. Preferably, in the first embodiment, the slaving means only comprise the electrodes 24.1 and 24.2.

The actuating electrodes are individually electrically connected to the controlling means C by a contact pad 30.1, 30.2, 30.3, 30.41 respectively.

The operation of the pressure sensor is the following one. The pressure sensor can form a dynamic pressure sensor or a microphone for example.

In the example of FIGS. 1A and 1B, the first cavity is delimited in practice by the sidewall 5 and the beam 26. The pressure is actually exerted on the beam 26, as well as on the element 8, which results in moving the sensitive element. Similarly, the second cavity is delimited in practice by the other beam 26 and the other sidewall.

When a pressure variation appears in the atmosphere in communication with the first cavity 6, the second cavity 14 being initially in pressure balance with the pressure of the first cavity, the pressure variation is applied to the sensitive element 8. By assuming that the pressure variation is positive, a force is applied to the beam 26 toward the second cavity, causing the movable structure and thus the movable wall to be pivoted in the clockwise direction and the gauge to be compressed. The associated resistance change is transformed into an electrical signal by an electronic system, comprising for example a Wheatstone bridge.

This signal is sent to the electronic control means of the feedback loop.

The electronic control means of the feedback loop then generate a signal for controlling the actuating electrodes as a polarization signal in order to slave in position the sensitive element in order to cancel the incident acoustic pressure via a voltage-controlled electrostatic pressure. The control depends on the signal measured by the detecting means, to which a correction is possibly applied. The physical signal of interest, i.e. the output signal from the microphone, is proportional to the amplitude of the counter-feedback pressure applied by the actuating electrodes.

Figure 16:
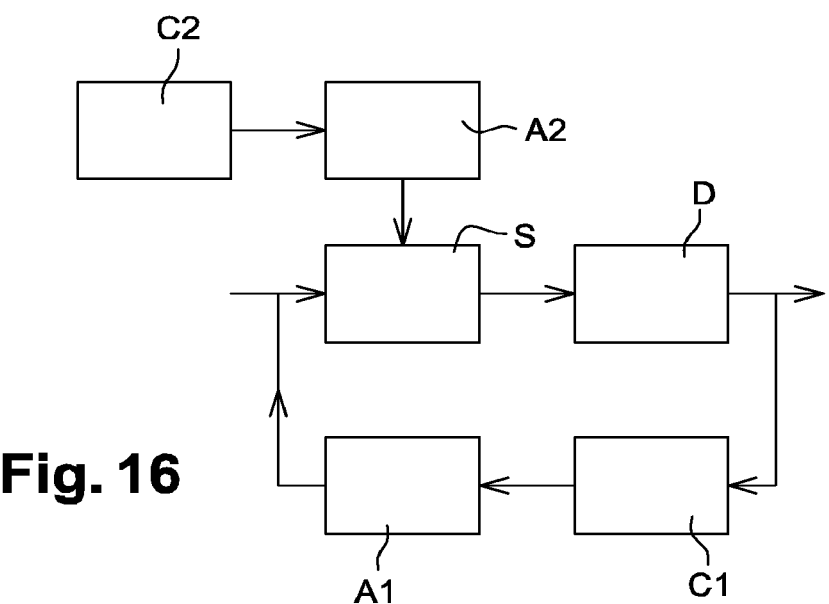
FIG. 16 is a representation of a block diagram of the slaving in position of the in-plane movement or deformation pressure sensor.

The system can be depicted by a simplified bloc diagram represented in FIG. 16 in which the sensitive element is designated as S, the detecting means are designated as D, the controlling means for controlling the slaving means as C1, the slaving means are designated as A1. On the bloc diagram, trimming means C2 and actuating means A2 controlled by the trimming means C2 which will be described below are represented.

The detecting means D detect the movement of the sensitive element; this signal is used to determine the pressure in the first cavity and by the means for controlling the slaving means, these controlling means C1 generate a command to the slaving means A1.

For a non-slaved sensor, the pass band is only determined by the mechanical transfer function. In the case of the present invention, the resonance frequency of the movable structure is not the only parameter setting the pass band. By virtue of the slaving position, the pass band also depends on the slaving electronics. The pass band and resolution problems are thus decoupled in the sensor according to the invention and the pass band and resolution can be separately optimized.

Furthermore, the pressure dynamics likely to be measured can be independently chosen regardless of the mechanical parameters, via the slaving electronics as well. Indeed, the signal amplitude at the transduction (piezoresistive or capacitive) means is lower than that of the equivalent system without slaving system. In this case, the dynamics is limited by dimensioning and controlling the actuating electrodes.

By virtue of the invention, there are thus further degrees of freedom to optimize the performance of the pressure sensor, in terms of pass band, dynamics and resolution. In particular, the dimensioning of the sensitive element can be optimized without being limited by the transduction means. The stiffness and inertia of the movable structure can be chosen so as to achieve the best resolution possible, regardless of the pass band.

Figure 18:
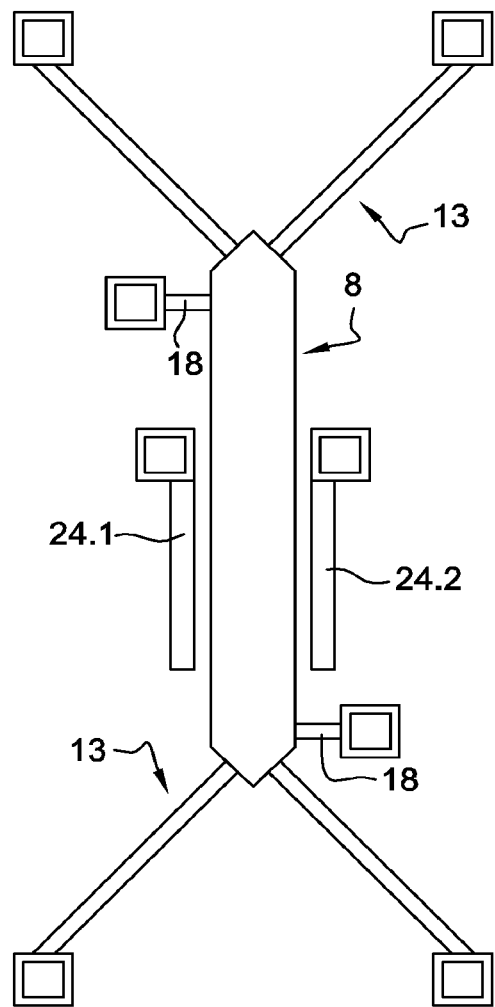
FIG. 18 is a schematically represented top view of an alternative embodiment of the pressure sensor comprising two pivot hinges.

In FIG. 18, another variant embodiment of the sensor according to the invention can be seen wherein the movable structure, instead of being hinged by an end to the substrate, is hinged to the substrate at both its ends by pivot connections 13 with an axis perpendicular to the plane of the substrate. The structure is able to be deformed under the action of an external pressure field. This alternative has advantageously a better mechanical resistance to external impacts. Several piezoresistive gauges can be implemented, two gauges are implemented in FIG. 18. Further, the capacitive type slaving means comprise two electrodes on either side of the movable wall the faces of which form electrodes.

Figure 2B:
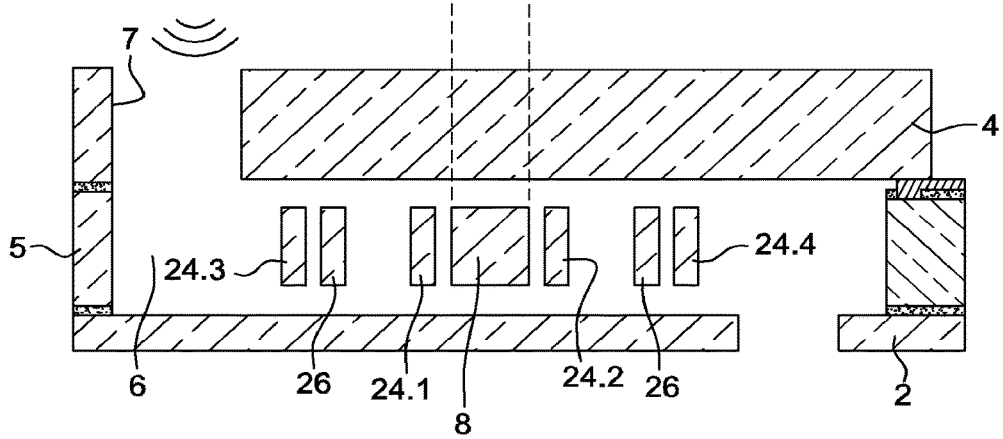

In FIGS. 2A and 2B, another example of the first embodiment in which the pressure sensor also implements trimming means can be seen.

The trimming means are of the capacitive type and implement at least one pair of electrodes. In the example represented, two of the pairs of actuating electrodes are used to perform trimming, for example the pairs comprising the electrodes 24.3 and 24.4. It will be understood that a sensor with at least one pair of electrodes dedicated to trimming in addition to the four electrodes dedicated to actuating does not depart from the scope of the present invention.

In the case of trimming, the electrodes are polarized such that the sensitive element is subject to a force depending on its position, and a null force when the sensitive element is in its balance position.

Trimming can be regarded as generating a negative stiffness; therefore it can be implemented to modify the overall stiffness of the movable structure of a sensor. By virtue of the action of trimming electrodes, the total stiffness of the device can be decreased, which enables sensitivity to be increased.

The implementation of the trimming means with the slaving means is particularly advantageous because it is not detrimental to the pass band.

By making a sensor with a reduced stiffness by virtue of the trimming means, this has a large pass band without losing sensitivity at low frequencies, i.e. at frequencies lower than the resonance frequency.

The implementation of trimming means also has an advantage when the detecting means are of the piezoresistive type. The shape of the gauge(s) takes into account both the transmission of stresses in the gauges and the contribution of gauges to the overall stiffness. By virtue of the trimming means which enable a negative stiffness to be added, it is possible to compensate for the stiffness of the gauge(s). It is then possible to optimize the structure of the gauges to transmit the stresses in the gauges without accounting for the impact on the overall stiffness. The gain on the entire pass band can then be increased.

On the one hand, trimming enables the optimum stiffness of the microsystem to be chosen; on the other hand, in the case of a pressure sensor implementing at least one piezoresistive gauge, it enables the transmission of stresses in the gauges to be optimized.

In the example described and preferably, the actuating electrodes and trimming electrodes are distinct. Alternatively, it can be provided to use the same electrodes to perform slaving and trimming. For this, the electrode are polarized with a voltage comprising a DC signal and an AC signal, the DC signal serving for trimming and the AC signal for slaving. Preferably, the amplitude of the AC signal is very lower than that of the DC signal.

Figure 3A:
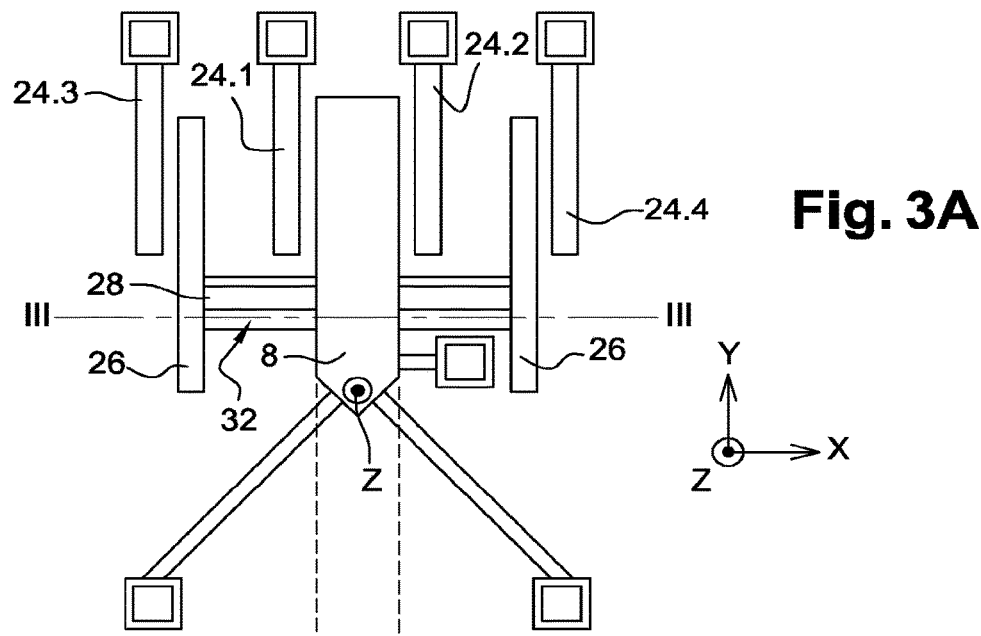
Figure 3B:
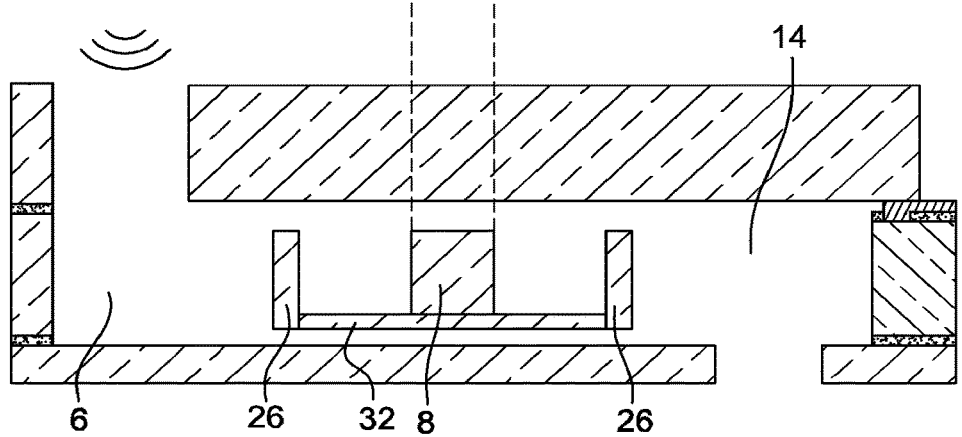

In FIGS. 3A and 3B, another example embodiment of the sensor according to the first embodiment having a lighter movable structure can be seen.

The movable structure comprises the sensitive element 8, the additional beams 26 connected to the sensitive element 8 by arms and a linking element 32 extending between both additional beams and under the arms.

This linking element has a relatively lower thickness than that of the sensitive element, for example 20 times lower, or even 100 times lower. It has for example a thickness of 250 nm for a sensitive element with a thickness 20 µm. Its implementation enables the rigidity of the movable structure to be increased without increasing too much its inertia, such that its deformation under the effect of the incident pressure remains negligible.

Figure 4A:
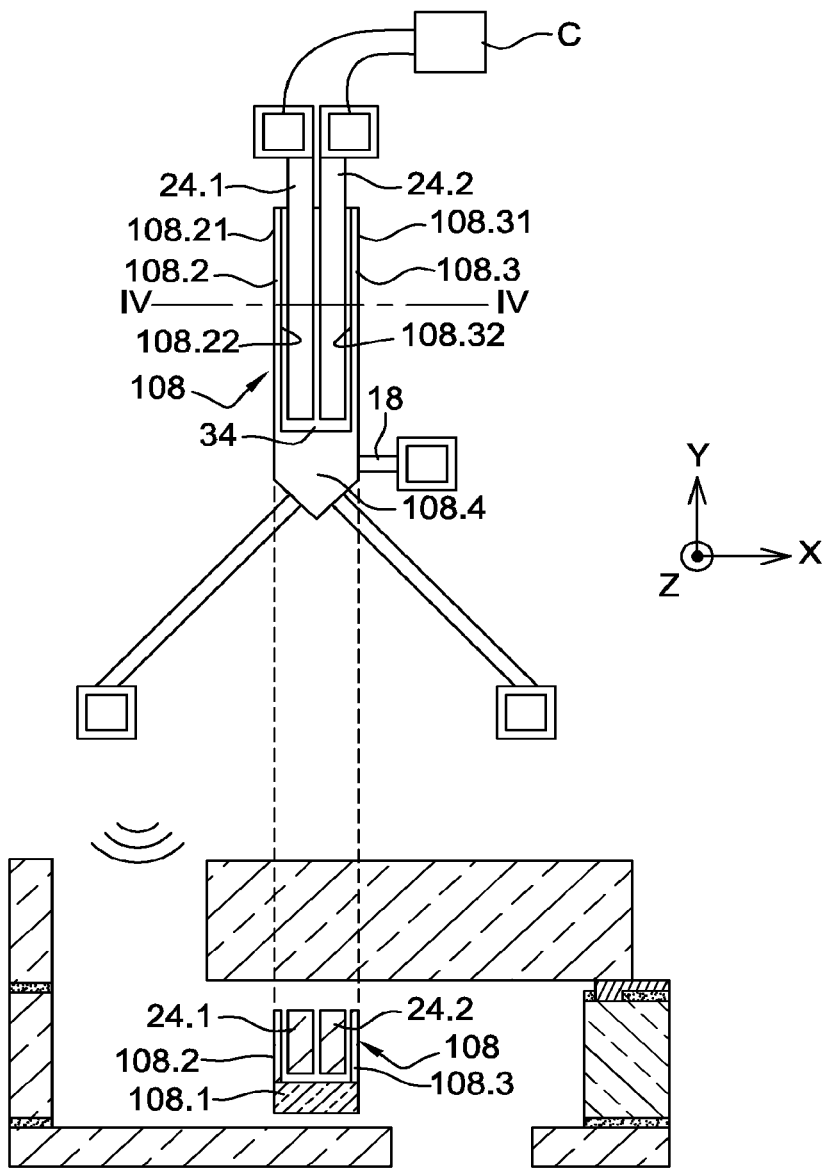
FIGS. 4A and 4B are top and cross-section views along plane IV-IV respectively of an exemplary embodiment of a second embodiment of a pressure sensor, FIG. 4' is a transverse cross-section view of an alternative embodiment of the example of FIGS. 4A and 4B, FIGS. 5A and 5B are top and cross-section views along plane V-V of the pressure sensor of FIGS. 4A and 4B wherein a piezoresistive gauge is thinned.
Figure 4B:
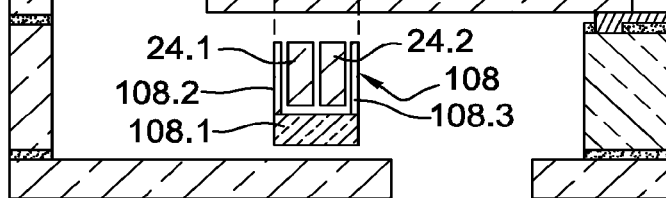

In FIGS. 4A and 4B, an example of a second embodiment of a pressure sensor is represented.

This embodiment differs from the first embodiment in that the sensitive element 108 comprises a housing 34 for housing the actuating electrodes.

For this, in the example represented, the sensitive element 108 comprises a lower bottom 108.1, two sidewalk 108.2, 108.3 and an end wall 108.4 connected to the beams defining the axis of rotation Z. A first sidewall 108.2 is disposed on the side of the first cavity, it has an external face 108.21 on the side of the first cavity and an internal face 108.22 carrying an electrode facing the electrode 24.1, the external face 108.21 thus notices the pressure variation of the atmosphere connected to the first cavity. The second partition wall has an external face 108.31 on thy: side of the second cavity and an internal face 108.32 carrying an electrode facing the electrode 24.2. The electrodes 24.1 and 24.2 are received side by side in the housing 34.

When the material of the sensitive element 108 is electrically conductive, for example of doped silicon, the movable electrodes can be formed by the walls of the sensitive element themselves. In the opposite case, the movable electrodes are formed by a conductive deposit on the inner faces 108.22 and 108.32 of these sidewalls 108.2, 108.3.

Advantageously, the lower bottom can be cut out, enabling the movable structure to be lightened while ensuring sufficient rigidity.

Preferably, the side partition walls 108.2, 108.3 and the end partition wall 108.4 are made as a single piece with the suspension beams.

The actuating electrodes 24.1, 24.2 are anchored to the substrate by a longitudinal end by a connection pad, the other longitudinal end which is free facing the end partition wall 108.4. A parasitic capacitance can appear between the electrode end and the end partition wall 108.4, but this can be reduced by increasing the space between the electrode and the end partition wall 108.4.

Since the actuating electrodes are not in the cavities, then they do not provoke a head loss upstream and downstream of the movable structure, the upstream and downstream being considered to be the first cavity and the second cavity, respectively.

The electrostatic actuation for slaving the sensitive element in position implements different areas from that used for sensing the pressure variations. This embodiment is particularly advantageous because it enables a pressure sensor having an increased sensitivity with respect to that of the sensor of the first embodiment to be made. Indeed, the sensitivity of the sensor depends on the area of the movable structure, which is exposed to the incident pressure. On the other hand, strains exerted on the movable structure by the actuating electrodes are also proportional to the area facing it. Consequently, some facing area is required for the actuation.

Further, this configuration makes it possible to have an area noticing the pressure substantially equal to that acting for the actuation. This configuration enables the areas of the sensitive element to be avoided from being increased in order to compensate for the presence of the actuating electrodes. This increase in area would result in an increase in the inertia of the movable structure, which would be also detrimental to the sensitivity of the sensor.

In the example represented, the sensor comprises detecting means with a piezoresistive type strain gauge.

By way of example, the movable structure has for example a height between 5 µm and 50 µm, a length between 100 µm and 1 mm, a total thickness considered in the movement direction of the movable structure between 5 µm and 30 µm. The bottom of the movable structure has for example a thickness between 100 nm and 1 µm.

The electrodes have for example a thickness between 1 µm and 5 µm and the distance between the electrodes is for example between 5 µm and 10 µm.

This embodiment has also the advantage to offer a reduced in-plane bulk with respect to the first embodiment.

In this exemplary embodiment, the actuating electrodes can be used for performing trimming. For this, to the electrodes is applied a polarization signal comprising a DC signal and an AC signal as has been described above.

As a variant, the actuating electrodes could be attached to the cap in a zone facing the housing and not be suspended by a longitudinal end.

As a further variant, the sensitive element could comprise a housing which is not open to the cap but open to the support, then it would comprise an upper bottom instead of a lower bottom. The electrode could then be suspended by an end as in the example represented in FIGS. 4A and 4B or attached to the support in a zone facing the housing.

Figure 4:
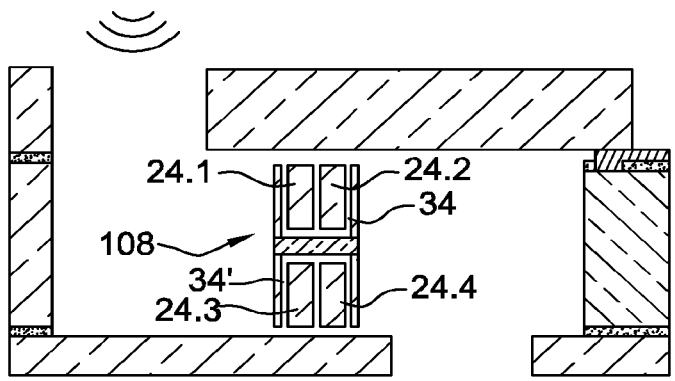

As a further variant, as is represented in FIG. 4', it could be contemplated to make a sensitive element having an H-shaped transverse cross-section, a housing 34' being delimited under the housing 34 and separated from the same by the bottom 108.1. The trimming electrodes 24.3, 24.4 are housed in the housing 34' and are superimposed with the actuating electrodes 24.1, 24.2. Conversely, the actuating electrodes 24.1, 24.2 could be located in the housing 34' and the trimming electrodes in the housing 34.

The exemplary hinges of FIGS. 2A' and 2A" are applicable to the second embodiment.

Figures 5A, 5B:
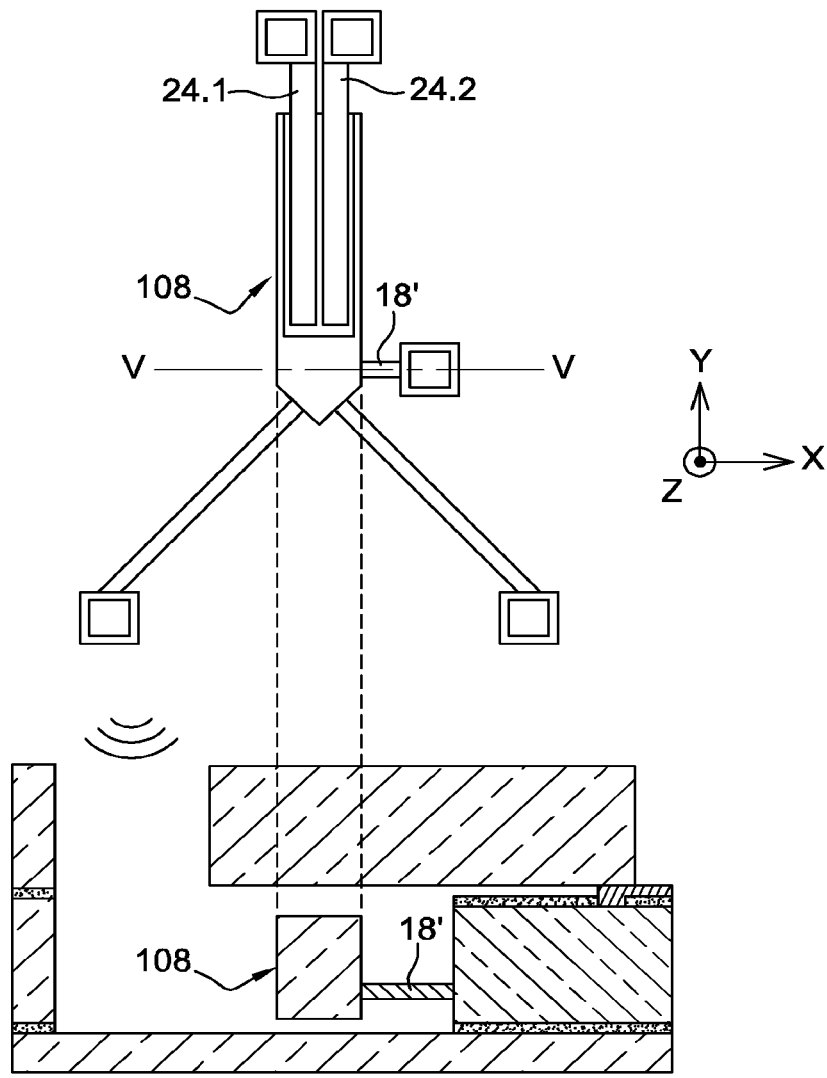

In FIGS. 5A and 5B, a variant in which the piezoresistive type detecting means comprise a thinned gauge, called a nanogauge 18', can be seen. The nanogauge has for example a typical width between 250 nm and 2 μm; and a length between 1 μm and 10 μm. The thickness of the nanogauge is for example equal to that of the sensitive element, for example between 5 μm and 50 μm. In a variant, the nanogauge can be thinned and have a thickness between 100 nm and 1 μm.

The implementation of one or more nanogauges enables the stresses to be concentrated in the gauge, which are inversely proportional to the cross-section area of the gauge.

Figure 6:
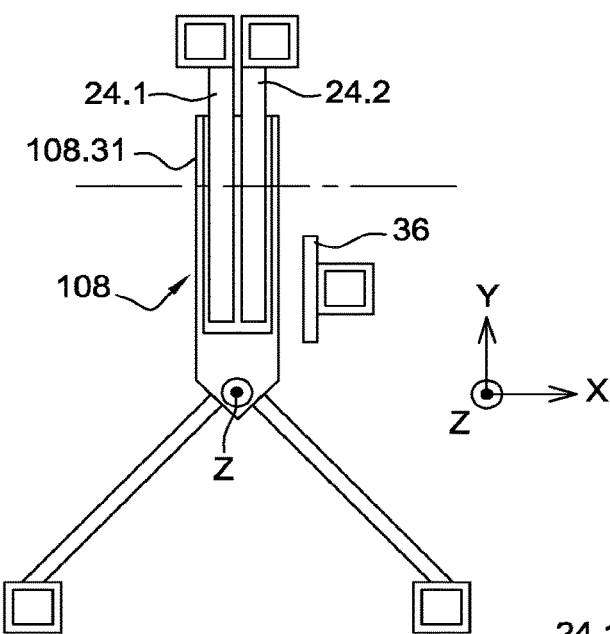
FIG. 6 is a top view of an alternative of the sensor of FIGS. 4A and 4B with a capacitive detection.

In FIG. 6, an alternative embodiment of the sensor of FIGS. 4A and 4B can be seen, wherein the detecting means are of the capacitive type. They comprise an electrode 36 preferably disposed in the second cavity facing the face 108.31 of the second partition wall of the sensitive element 108. The electrode 36 is fixed with respect to the support and is connected to a connection pad, it forms together with the face 108.31 of the second partition wall 108.3 a variable air gap variable capacitor the capacitance of which varies according to the rotational movement of the sensitive element. By disposing the electrode 36 in the second cavity, the area undergoing the pressure variation is avoided to be reduced. However, it is provided to form a variable capacitor with the face 108.21 either by replacing the variable capacitor in the second cavity, or in addition to make a differential measurement. Alternatively, the variable capacitor could be with variable area.

Figure 7:
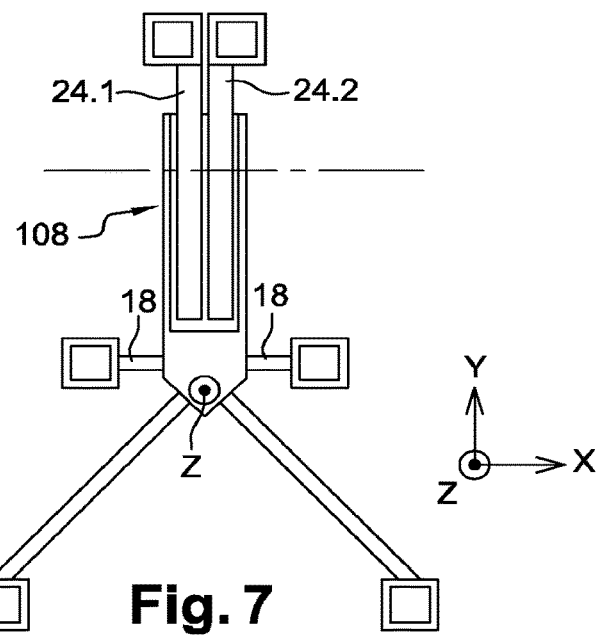
FIG. 7 is a top view of an alternative of the sensor of FIGS. 4A and 4B with a piezoresistive detection implementing two piezoresistive gauges.

In FIG. 7, a sensor can be seen wherein the detecting means implement two piezoresistive gauges 18, the first one attached to one side of the sensitive element and the other attached to the other side of the sensitive element with respect to the axis of the sensitive element. During a rotational movement, one of the gauges is compressed and the other is stretched, the gauges can be connected in a Wheatstone bridge allowing a differential measurement.

In the example represented, the gauges 18 are attached to the sensitive element at the end wall 108.4. For example, the distance along the axis of the sensitive element between the axis of rotation and the fastening point of the gauges to the sensitive element is of a few micrometer, whereas the sensitive element has for example a length of 100 μm. But, it could be provided to attach the gauges farther from the axis of rotation at the side partition walls 108.2 and 108.3. The stiffness due to the gauges can be compensated for at least partly by the trimming means.

It can further be provided to implement more than two gauges, for example four or more, the gauges being distributed on either side of the sensitive element, the implementation of several nanogauges enables the signal to be increased in some cases, for example if the gauges are inserted in a same Wheatstone bridge. Further, by increasing the number of gauges, the strain is decreased in each of the gauges, and thus the full scale is increased.

The stiffness due to gauges can be compensated for at least partly by the trimming means.

Figure 8:
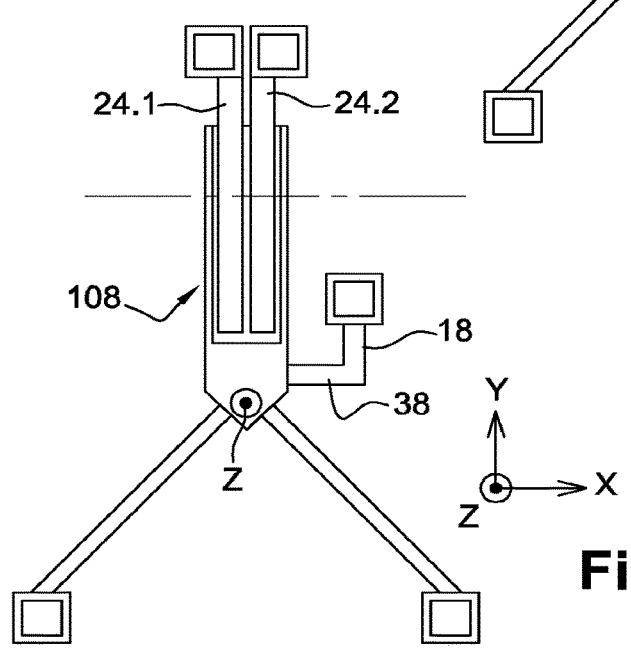
FIG. 8 is a top view of an alternative of the sensor of FIGS. 4A and 4B with a piezoresistive detection having an orientation of the piezoresistive gauge parallel to the detecting element.

In FIG. 8, another alternative embodiment of the sensor of FIGS. 4A and 4B can be seen, wherein the piezoresistive gauge extends in parallel with the axis of the sensitive element and not perpendicularly. For this, the sensitive element comprises a side arm 38 extending in the second cavity, the gauge being suspended between the arm 38 and the connection pad, the arm transmitting the movement to the gauge. This configuration can be advantageous in some implantations.

In FIG. 9, yet another alternative embodiment can be seen, wherein the second cavity is open not in the support substrate opposite to the aperture of the first cavity, but comprises a side aperture 40, i.e. in the intermediate substrate between the support and the cap. It is to be noted that in this alternative, the first cavity is disposed on the right of the sensitive element in the representation of FIG. 9 whereas in the previously described examples and alternatives in the description, it was located on the left of the sensitive element. The piezoresistive gauge is then located in the first cavity. The operation of the sensor is unchanged.

This side aperture of the second cavity can be advantageous for some implantations. It can enable the total thickness of the MEMS to be decreased and its integration to be facilitated in size-restrained devices. In addition, the acoustic path between the downstream cavity and the back-volume is the viscous friction place and thus the source of a noise associated with these losses. The side aperture can enable this noise to be decreased.

In FIGS. 10A and 10B, another exemplary embodiment can be seen wherein the electrodes 24.1, 24.2 are electrically connected to a polarization source by connection pads 42 substantially located in an intermediate zone between the longitudinal ends, preferably in a median zone, of the electrodes and attached to the cap.

In the alternative where the sensitive element comprises a housing 34' open to the support substrate, it can be contemplated that the electrodes are electrically connected to a polarization source by connection pads substantially located in a zone intermediate between the longitudinal ends, preferably in a median zone, of the electrodes and attached to the support substrate.

In FIG. 11A to 11C, a particularly advantageous exemplary embodiment of a sensor according to the second embodiment can be seen. In this example, the lower bottom 108.1 comprises one or more through passages 44 and the electrodes 24.1, 24.2 are secured to the support substrate by one or more pillars 46.

Preferably, the pillars 46 are electrically insulated from the support substrate by an electrical insulator, such as $SiO_2$, in order not to short-circuit the electrodes. The electrodes are, in the example represented, connected by a longitudinal end to a connection pad. A pillar per electrode can be provided, preferably a great number of pillars distributed along the longitudinal direction of the electrodes are implemented. For example, the width of the pillars is between 1 μm and 25 μm. It can be provided a through passage per pillar or else that several pillars pass through a single through passage.

Alternatively, the pillar or one of the pillars or several pillars could be replaced by a contact pad as those implemented in the example of FIGS. 10A and 10B.

The pillars enable the rigidity of the actuating/trimming electrodes to be kept, such that they do not move under the effect of the electrostatic forces between the sensitive element and the electrodes themselves.

In FIGS. 12A and 12B, another exemplary embodiment of a sensor according to the second embodiment can be seen. This differs from the examples described below by the fact that the electrodes have a structuration which facilitates flow of air, and more generally the gas fluid located between the partition walls 108.2 and 108.3 and the electrodes 124.1, 124.2, which reduces viscous damping, called "squeezed-film damping", as well as the acoustic noise inherent to this damping; the degradation of the microphone resolution is hence reduced. In the example represented, the electrodes have, in a front view, a serrated structuring, the serrations located above the axis of the electrode being axially offset with respect to the serrations located below the axis. It will be understood that any other structuring shape is contemplatable by taking into account however not to reduce too much the actuating areas of the electrodes.

Further, unlike off-plane pressure sensors for which the viscous damping appears at the detecting means and for which the structuring of the detecting electrode results in a decreased microphone sensitivity, the structuring of the actuating electrodes has no influence on the sensitivity of the sensor according to the invention.

The fixed actuating electrodes of the first embodiment could also be structured to reduce this damping.

In FIG. 13, another exemplary embodiment of a sensor according to the second embodiment can be seen. This sensor comprises stop means 48 for limiting the rotational movement of the movable structure and protecting it from too high a pressure differential.

In the example represented, the stop means are secured to the support substrate and are disposed on either side of the sensitive element with respect to its axis at its free longitudinal end. The stop means are symmetrically disposed with respect to the sensitive element. The stop means could be disposed at other locations along the sensitive element. The distance between the stop means and the external faces of the partition walls 108.2, 108.3 determines the clearance permitted for the sensitive element.

Alternatively, the stop means could be attached to the cap.

Figure 14:
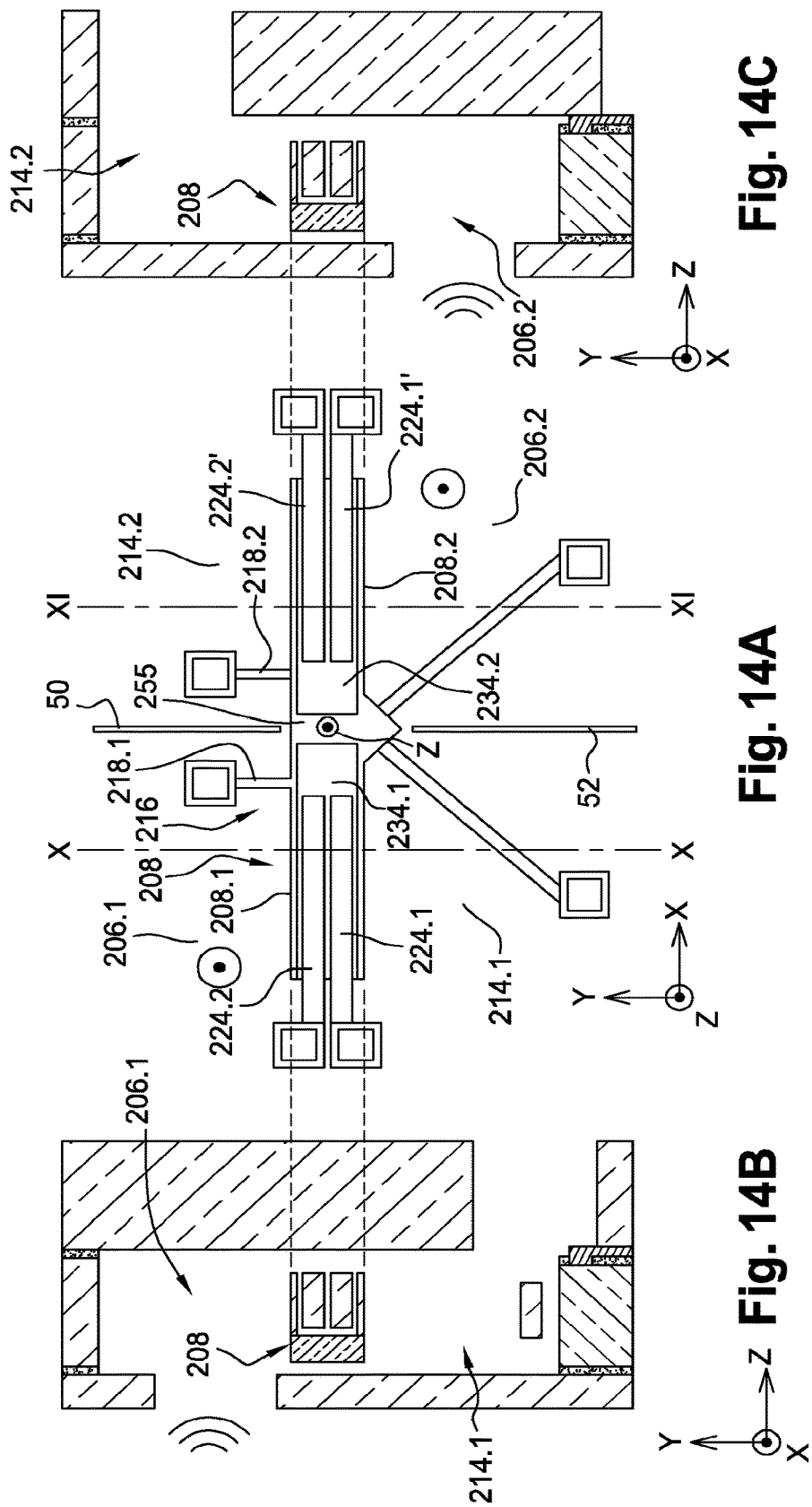
FIG. 14A is a top view of another example according to the second embodiment of a sensor wherein the sensitive element is rotatably hinged at its centre of gravity.
FIGS. 14B and 14C are cross-section views along planes X-X and XI-XI of the sensor of FIG. 14A.

In FIG. 14A to 14C, another particularly advantageous example of the second embodiment can be seen.

The sensor comprises two first deformable cavities 206.1 and 206.2 connected to the atmosphere the pressure variations of which are desired to be measured and insulated from each other. It comprises two second cavities 214.1, 214.2 insulated from each other.

The sensor also comprises a sensitive element as a beam which is rotatably hingedly mounted to the support substrate. The sensitive element 208 forms the deformable partition wall both for the cavity 206.1 and the cavity 206.2.

For this, the hinge axis Z is located not at one end of the sensitive element but in a zone intermediate between both longitudinal ends of the sensitive element, thus the sensitive element is divided into two longitudinal portions, one on one side of the axis of rotation Z sensitive to the pressure in the cavity 206.1 and the other on the other side of the axis of rotation Z sensitive to the pressure in the cavity 206.2.

Preferably, the axis of rotation Z passes through the centre of gravity of the sensitive element 208, thus both longitudinal portions 208.1, 208.2 are of the same length and offers an identical pressure sensitive area.

In this example, the hinge comprises two beams having intersecting axes connected to a longitudinal face of the sensitive element 208.

As can be seen in the cross-section views of FIGS. 14B and 14C, the deformable cavity 206.1 and the deformable cavity 206.2 are disposed such that the sensitive surface of the deformable cavity 206.1 and that of the cavity 206.2 are located on opposite faces of the sensitive element such that the pressure acting in both deformable cavities on the sensitive element rotates it.

The deformable cavity 206.1 is separated from the cavity 214.2 by a partition wall 50 extending between the support and the cap, and the deformable cavity 206.2 is separated from the cavity 214.4 by a partition wall 52 extending between the support and the cap. The partition walls 50 and 52 aim at acoustically insulating the cavities 214.2 and 214.4. The partition walls 50 and 52 are not in contact with the sensitive element not to disturb its movement and the clearance between the edge of the partition walls 50, 52 and the sensitive element is sufficiently low not to disturb measurements.

The sensitive element 208 has a transverse cross-section U shape open to the cap. However, it comprises two housings 234.1, 234.2 separated from each other by a transverse partition wall 255 at which there is the axis of rotation Z. Both housings 234.1, 234.2 are open at a longitudinal end of the sensitive element. The partition wall 255 enables the rigidity of the sensitive element to be ensured.

The slaving means comprise four pairs of electrodes, two fixed electrodes 224.1, 224.2 being disposed in the housing 234.1 and two fixed electrodes 224.1', 224.2' being disposed in the housing 234.2. In this example, the electrodes are anchored to the support by connection pads ensuring polarization thereof.

The sensor comprises detecting means 216 which are of the piezoresistive type in the example represented. They comprise two piezoresistive gauges 218.1, 218.2 disposed on either side of the partition wall 50 and each detecting the movement of the sensitive element 208, the one being tensionally biased and the other being compressionally biased. The gauges can be connected in a Wheatstone bridge allowing a differential measurement. Alternatively, the detecting means can be of the capacitive type.

This connection has the advantage to offer a sensor with a low sensitivity to accelerations. Indeed, in case of an acceleration for example perpendicular to the axis of the sensitive element, this would be moved in the sensor plane perpendicular to its axis of rotation causing either a compression of both gauges or an extension of both gauges. Because of the Wheatstone bridge connection, the signal emitted in this case would be null.

The operation of the sensor of FIG. 14A to 14C will now be described.

Both first cavities 206.1, 206.2 are connected to the atmosphere the pressure variation of which is desired to be measured. A pressure increase is considered. When the pressure increases, a pressure difference appears between the first cavity 206.1 and the second cavity 214.1 and between the first cavity 206.2 and the second cavity 214.2. A strain is then applied to the faces of the portions 208.1, 208.2 of the sensitive element 208 located in the deformable cavities 206.1, 206.2. Because of their relative disposition, the strain exerted on the portion 208.1 and that exerted on the portion 208.2 are added causing, in the example represented, a rotation in the anti-clockwise direction of the sensitive element 208. This rotation exerts a tensile strain on the gauge 218.1 and a compression strain on the gauge 218.2, causing an electrical signal to be emitted. The control means polarize the actuating means in order to slave the sensitive element in position.

Figure 15:
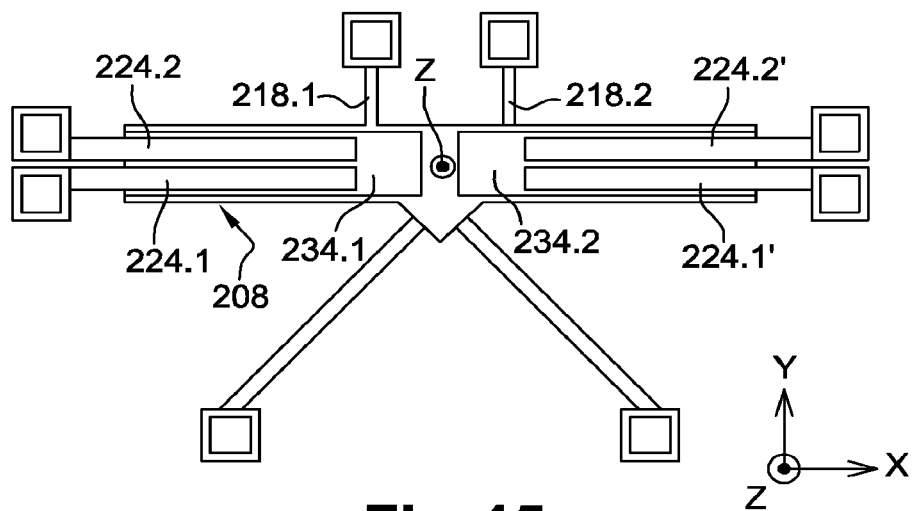
FIG. 15 is a top view of another example according to the second embodiment of a sensor wherein the sensitive element is rotatably hinged at its axis of symmetry and trimming means are implemented.

In FIG. 15, an alternative sensor of the FIG. 14A to 14C can be seen wherein the sensor also comprises trimming means. For example, the electrodes 224.2, 224.2' are not used for slaving but for trimming.

It will be understood that the examples of the different embodiments can be combined without departing from the scope of the present invention. In a particularly advantageous example, the sensor has the structure of that of FIG. 14A to 14C or 15, the electrodes secured to the substrate through the cut-out lower bottom of the sensitive element, the actuating and/or trimming electrodes being structured to reduce the squeezed film damping phenomenon.

A pressure sensor according to the second embodiment in which one of the actuating electrodes is inside the sensitive element and the other is outside the sensitive element does not depart from the scope of the present invention.

Further, a pressure sensor according to the second embodiment comprising a single trimming electrode disposed inside the sensitive element generating electrostatic strains on both sides of the electrode, can be sufficient to generate the required negative stiffness.

Figure 19:
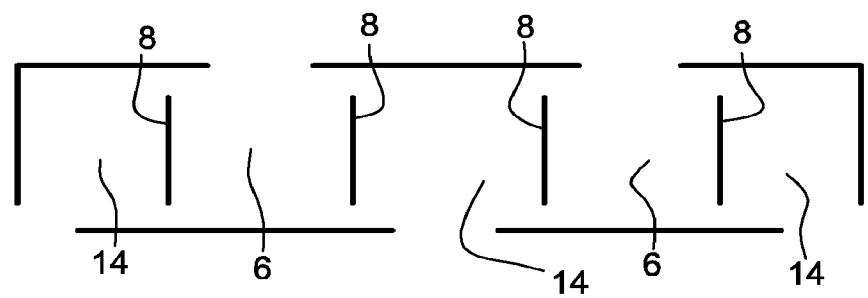
FIG. 19 is a schematic representation of a pressure measuring system with several cavities and several sensitive elements.

In FIG. 19, an exemplary pressure measuring system schematically represented can be seen, comprising several sensitive elements 8 associated with distinct cavities 6, 14. For example two distinct movable elements 8 can share one cavity. Four movable beams can be considered, for example, with two first cavities 6 and three second cavities 14 in total.

The present invention enables on the one hand the pass band of the system, and on the other hand the stiffness and inertia of the structure to be optimized separately.

It also makes it possible to make the shape or design of the structure independent of the dynamics and gain of the microsystem.

In the case of a piezoresistive detection device, the invention enables the stiffness of the movable structure to be chosen regardless of the strain transmission in the strain gauge, and thus several gauges to be implemented and to be chosen in terms of location.

Since the movable structure remains closer to its balance point by virtue of the slaving means, the system has less non-linearities. Further, if the input signal comprises a component at the resonance frequency, the risk that the movable structure contacts the fixed part is avoided because of the slaving means which cancel the mechanical resonance.

An exemplary method for making a sensor according to the second embodiment comprising a slaving electrode inside the sensitive element and a slaving electrode outside the sensitive element 4B will now be described using FIG. 17A to 17I.

On the one hand, a first sub-assembly is made on the support substrate.

Figure 17A:
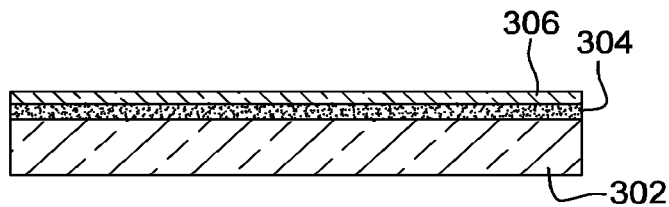
FIG. 17A to 17I are schematic cross-section views of elements obtained during the different steps of making an example of a method for making the sensor according to the invention.

On a first so-called support substrate 302, which could be of semi-conductor material, of silicon for example, a deposit of a sacrificial layer 304 is made. This dielectric layer could advantageously be of silicon oxide deposited through Plasma-Enhanced Chemical Vapour Deposition (PECVD), Low-Pressure Chemical Vapour Deposition (LPCVD) or by thermal oxidation. Its thickness could be between a few hundreds of nanometers and a few microns, 5 µm for example. Then, a layer of semi-conductor material 306 preferentially based on Si or SiGe and with a thickness between 200 nm and 5 µm is deposited. One can also start from a SOI type substrate (FIG. 17A).

Figure 17B:
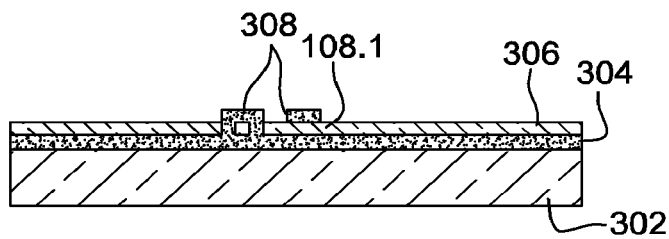

During a next step, a lithography and an etching of the layer 306 are made to define the gauge 18 and the internal bottom 108.1. Then, a second sacrificial layer 308 is formed on the layer 306, with a thickness between a few hundreds of nanometers and a few microns, and then a lithography and an etching of the sacrificial layer 308 are made to obtain protection for the gauge 18 and the lower bottom 108.1 of the sensitive element. In this representation, the gauge 18 is not represented along its length but in a transverse cross-section in order to show the sacrificial layer. The resulting element is represented in FIG. 17B.

During a next step, a layer 309 of silicon is formed for example by LPCVD or PECVD deposition onto the layer 306 and onto the sacrificial layer 308, on a thickness typically of 5 to 50 µm, and then an etching of the same is made, for example by RIE or Deep Reactive Ion Etching (DRIE), so as to form the non-deformable walls of the cavities, the lower bottom of the sensitive element, the sidewalls of the sensitive element and the electrodes.

Figure 17C:
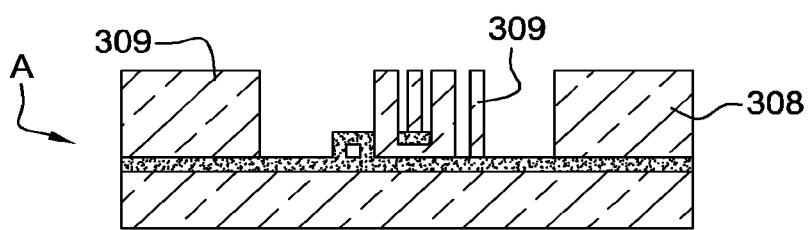
Figure 17D:

The resulting sub-assembly A is represented in FIG. 17C.

On the other hand, a second sub-assembly is made on the cap substrate carrying the contacts and electrical connections.

On a substrate 310 for example of silicon (FIG. 17D), a layer 312 of dielectric material having a thickness typically of a few tens of nanometers to the few µm is formed. This dielectric layer 312 can be for example of silicon oxide, deposited through PECVD, LPCVD or thermal oxidation. The via 312' is defined by a lithography and an etching of the layer 312. Then, a conductive layer, for example of AlSi is formed, with a thickness ranging from a few hundreds of nanometers to a few µm, made by sputter coating for example (PVD) or evaporation. Then a lithography and an etching of the conductive layer, for example by RIE, are made, so as to form a contact 314, and a conductive portion 316 distinct from the contact 314. This set of technological steps can be repeated in order to make one or more interconnection level(s).

Figure 17E:
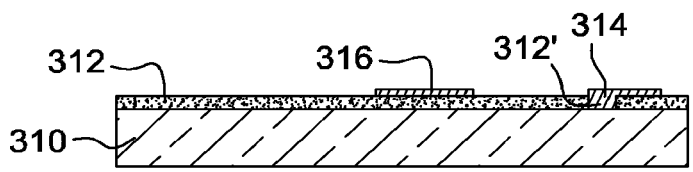

The resulting element is represented in FIG. 17E.

For the last conductive layer, a conductive layer enabling sealing of this cap substrate with the support substrate to be made in parallel could advantageously be chosen. This material then will depend on the sealing technique chosen, eutectic sealing, thermocompression for example. By way of example, the case of a sealing made by forming eutectic alloy AuSi has been taken.

Figure 17F:
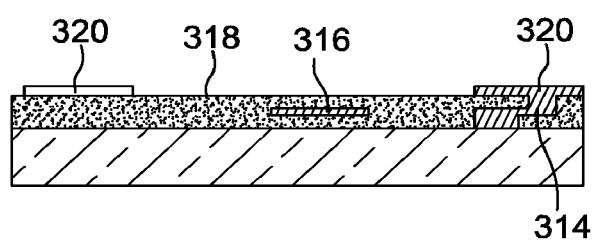

In FIG. 17F, sealing beads of Au 320 made with the already previously set forth technological steps has been represented.

Then, both sub-assemblies A and B are assembled such that the contacts of the sub-assembly B are in contact with the walls of the cavities of the sub-assembly A. In the example chosen, assembly is made by eutectic sealing between the Au sealing beads present on the cap substrate and the Si of the support substrate.

Figure 17G:
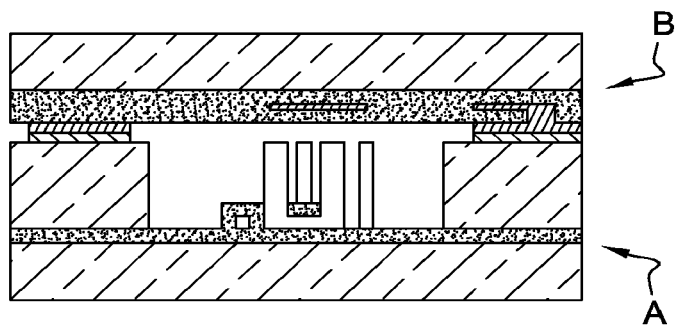

The resulting element is represented in FIG. 17G. During a next step, the apertures of the cavities are made, for example by etching a cap and a support, for example through DRIE.

Figure 17H:
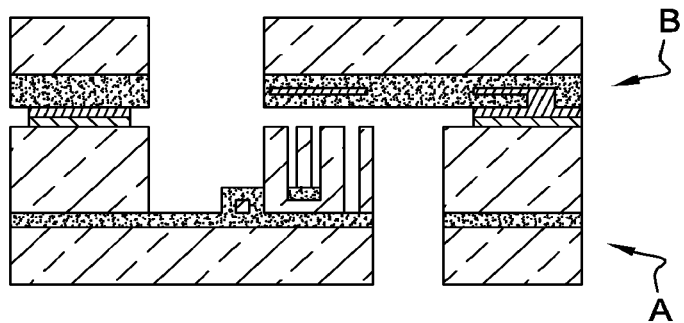

The resulting element is represented in FIG. 17H.

During a next step, the sensitive element 8, the gauge 18 and the electrodes are released by etching the sacrificial layers, for example by hydrogen fluoride as vapour.

Figure 17I:
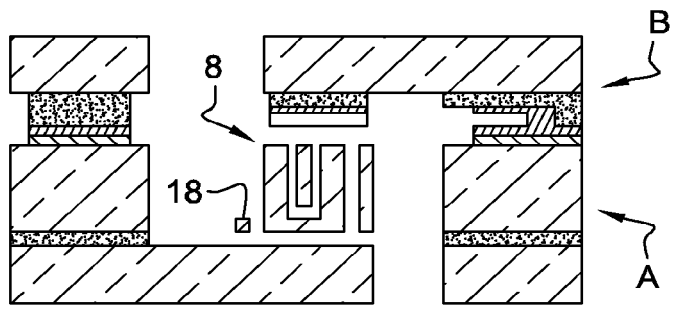

The resulting element is represented in FIG. 17I.

The invention is applicable to the manufacture of microphone type components by measuring acoustic pressure gradients, or dynamic pressure sensor type components, in particular for consumer applications (mobile telephony, games, MP3 player, television . . . ). The invention is also applicable to the manufacture of high performance components for biomedical devices, as for example cochlear implants.

The invention claimed is:

1. A MEMS and/or NEMS pressure sensor comprising, in a substrate extending in a sensor plane:
   a fixed part and a movable part being movable with respect to the fixed part, the movable part comprising at least one sensitive element configured to be moved or deformed in the sensor plane under effect of a pressure variation;
   at least one detector detecting movement or deformation of the sensitive element in the sensor plane due to a pressure variation;

a first actuator actuating the movable part, the first actuator controlled to slave in position the movement or the deformation of the sensitive element;

a first control circuitry controlling the first actuator and configured to polarize the first actuator from signals emitted by the detector, to slave in position the movement or the deformation of the sensitive element;

wherein the first actuator comprises at least two pairs of actuating electrodes, each pair comprising a fixed actuating electrode carried by the fixed part and a movable actuating electrode facing it, carried by the movable part, wherein the sensitive element comprises a sensitive face facing pressure variations to be sensed, the sensitive element further comprises two parallel walls, one of which carries the sensitive face, the two parallel walls have inner faces defining a housing therebetween, and wherein all or part of the fixed actuating electrodes are disposed within the housing, and all or part of the movable actuating electrodes are disposed on the inner faces of the two parallel walls.

2. The pressure sensor according to claim 1, wherein the first actuator is carried partly by the fixed part and partly by the movable part.

3. The pressure sensor according to claim 2, further comprising a second actuator actuating the movable part, which is a capacitive actuator, the second actuator being carried partly by the fixed part and partly by the movable part, and a second control circuitry controlling the second actuator to perform trimming of the sensitive element.

4. The pressure sensor according to claim 3, wherein the second actuator comprises at least two pairs of electrodes, each pair comprising a fixed electrode carried by the fixed part and a movable electrode facing it, carried by the movable part, all or part of the fixed electrodes being disposed in the housing and all or part of the movable electrodes being located on the inner faces of the walls of the housing.

5. The pressure sensor according to claim 3, wherein the first actuator and the second actuator are distinct.

6. The pressure sensor according to claim 3, wherein the first and second actuators coincide, and to which a polarization signal is applied comprising an AC component from the first control circuitry and a DC component from the second control circuitry.

7. The pressure sensor according to claim 1, wherein the movable part is rotatably hinged relative to the fixed part about an axis perpendicular to the sensor plane.

8. The pressure sensor according to claim 1, wherein the detector is a piezoresistive detector capacitive detector.

9. A pressure sensor according to claim 8, wherein the detector is a capacitive detector and is distinct from the first and/or second actuators.

10. The pressure sensor according to claim 1, wherein the sensitive element comprises a bottom connecting both parallel walls, the bottom comprising at least one through passage.

11. The pressure sensor according to claim 10, further comprising at least one pillar mechanically connecting at least one of the fixed electrodes to the fixed part through the through passage.

12. The pressure sensor according to claim 1, at least one of the actuating electrodes is structured to facilitate exhaust of ambient medium from a space delimited between a fixed electrode and a movable electrode.

13. The pressure sensor according to claim 1, wherein each fixed actuating electrode is connected to an electrical connection pad at a longitudinal end thereof or to an electrical connection pad in an intermediate part between both longitudinal ends thereof.

14. The pressure sensor according to claim 1, wherein the movable part is rotatably hinged relative to the fixed part about an axis perpendicular to the sensor plane, and wherein the sensitive element is hinged at at least one longitudinal end.

15. A pressure sensor according to claim 13, wherein the sensitive element is disposed between at least one first cavity connected to an environment in which pressure variations are desired to be measured and at least one second buffer cavity connected to the first cavity.

16. The pressure sensor according to claim 15, comprising two first distinct cavities connected to the environment in which pressure variation is desired to be measured, and two second buffer cavities, and wherein the sensitive element is subject to pressure variations of both cavities.

17. The pressure sensor according to claim 16, wherein the movable part is rotatably hinged relative to the fixed part about an axis perpendicular to the sensor plane, and wherein the axis of rotation of the rotating hinge is located between both longitudinal ends of the sensitive element.

18. The pressure sensor according to claim 1, wherein the detector is configured to achieve a differential measurement.

19. The pressure sensor according to claim 1, wherein all or part of the fixed actuating electrodes are disposed on either side of the sensitive element.

20. The pressure sensor according to claim 19, wherein one of the fixed actuating electrodes is facing the sensitive face.

21. The pressure sensor according to claim 19, wherein the movable part comprises at least two beams parallel to the sensitive element and disposed remote from the same, faces of the parallel beams facing the sensitive face forming all or part of the movable actuating electrodes.

22. The pressure sensor according to claim 1, wherein the substrate comprises a support substrate and a cap substrate, the first cavity being connected to the environment in which pressure variations are desired to be measured through an aperture of the cap substrate, the second cavity comprising an aperture in the support substrate opposite the aperture of the first cavity or a side aperture or the second cavity having a sufficient volume not to damp movement of the movable part.

23. The pressure sensor according to claim 1, forming a dynamic pressure sensor.

24. The pressure sensor according to claim 17, wherein the movable part is rotatably hinged relative to the fixed part about an axis perpendicular to the sensor plane, and wherein axis of rotation of the rotating hinge is located between both longitudinal ends of the sensitive element, or at an equal distance from both ends.

25. A microphone comprising at least one pressure sensor according to claim 24.

* * * * *